(12) United States Patent
Matsuda et al.

(10) Patent No.: US 10,951,100 B2
(45) Date of Patent: Mar. 16, 2021

(54) WINDING METHOD FOR ELECTRIC MOTOR STATOR, ELECTRIC MOTOR STATOR, AND FAN ELECTRIC MOTOR

(71) Applicant: Mitsubishi Electric Corporation, Tokyo (JP)

(72) Inventors: Shigeru Matsuda, Tokyo (JP); Takeharu Kato, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 400 days.

(21) Appl. No.: 15/766,520

(22) PCT Filed: Dec. 8, 2015

(86) PCT No.: PCT/JP2015/084455
§ 371 (c)(1),
(2) Date: Apr. 6, 2018

(87) PCT Pub. No.: WO2017/098590
PCT Pub. Date: Jun. 15, 2017

(65) Prior Publication Data
US 2018/0301965 A1    Oct. 18, 2018

(51) Int. Cl.
*H02K 1/14*       (2006.01)
*H02K 3/18*       (2006.01)
(Continued)

(52) U.S. Cl.
CPC ............ *H02K 15/095* (2013.01); *H02K 1/14* (2013.01); *H02K 3/18* (2013.01); *H02K 3/521* (2013.01);
(Continued)

(58) Field of Classification Search
CPC ............ H02K 1/14; H02K 3/18; H02K 3/521; H02K 3/522; H02K 2203/12;
(Continued)

(56) References Cited

U.S. PATENT DOCUMENTS 5,220,224 A    6/1993  Bosman et al.

FOREIGN PATENT DOCUMENTS

JP    09-215246 A      8/1997
JP    2005-353899 A   12/2005
(Continued)

OTHER PUBLICATIONS

Takeda, Machine Translation of JP2007137540, Jun. 2007 (Year: 2007).*

(Continued)

*Primary Examiner* — Quyen P Leung
*Assistant Examiner* — Eric Johnson
(74) *Attorney, Agent, or Firm* — Posz Law Group, PLC

(57) ABSTRACT

A winding method for an electric motor stator includes at a start of winding of the coil, a first step for forming a two-turn winding portion by winding a magnet wire upwardly around a pin for two turns; a second step, subsequent to the first step, for winding the magnet wire to cross the two-turn winding portion from an outside from an upper side to a lower side on a side surface of the pin opposite from the power supply terminal; and a third step, subsequent to the second step, for winding the magnet wire for a half turn above the two-turn winding portion and then guiding the magnet wire to the power supply terminal to be hooked on the bent back section.

3 Claims, 4 Drawing Sheets

(51) Int. Cl.
*H02K 3/52* (2006.01)
*H02K 15/095* (2006.01)

(52) U.S. Cl.
CPC ......... *H02K 3/522* (2013.01); *H02K 2203/12* (2013.01)

(58) Field of Classification Search
CPC .. H02K 15/0435; H02K 15/045; H02K 15/08; H02K 15/095; Y10T 29/49009; Y10T 29/49012; Y10T 29/49071
USPC ........................................................ 310/208
See application file for complete search history.

(56) References Cited

FOREIGN PATENT DOCUMENTS

| JP | 2007137540 A | * | 6/2007 |
|----|---|---|---|
| JP | 2009-254203 A | | 10/2009 |
| JP | 2010-130833 A | | 6/2010 |
| JP | 2010130833 A | * | 6/2010 |
| JP | 2011-035947 A | | 2/2011 |
| JP | 2011-129313 A | | 6/2011 |
| JP | 2013-212020 A | | 10/2013 |

OTHER PUBLICATIONS

Yamamoto, Machine Translation of JP2010130833, Jun. 2010 (Year: 2010).*
Office Action dated Jun. 18, 2019 issued in corresponding JP patent application No. 2017-554704 (and English translation).
Office Action dated Jun. 26, 2019 issued in corresponding CN patent application No. 201580085285.6 (and English translation).
International Search Report of the International Searching Authority dated Feb. 9, 2016 for the corresponding international application No. PCT/JP2015/084455 (and English translation).
Extended European Search Report dated Jul. 7, 2017 for the corresponding EP application No. 15890164.5.
Communication pursuant to Article 94(3) EPC dated Nov. 9, 2017 for the corresponding EP application No. 15 890 164.5.
Office Action dated Jan. 15, 2020 issued in corresponding CN patent application No. 201580085285.6 (and English translation).

* cited by examiner

WINDING METHOD FOR ELECTRIC MOTOR STATOR, ELECTRIC MOTOR STATOR, AND FAN ELECTRIC MOTOR

CROSS REFERENCE TO RELATED APPLICATION

This application is a U.S. national stage application of International Application No. PCT/JP2015/084455, filed on Dec. 8, 2015, the contents of which are incorporated herein by reference.

TECHNICAL FIELD

The present invention relates to a winding method for an electric motor stator, an electric motor stator, and a fan electric motor. More specifically, the present invention relates to a winding method at the start of winding of a coil.

BACKGROUND

In the conventional technique, a winding method for a coil at the start of winding in manufacturing of an electric motor stator, in which a magnet wire is fixed to a terminal pin, is disclosed (for example, see Patent Literature 1 and Patent Literature 2).

In Patent Literature 1, a magnet wire is first wound around a center portion of a terminal pin, wound upwardly several turns, and then wound downward. This winding forms a double winding with a portion of the magnet wire from an upper end to a center portion of the winding being held from the outside.

Further, in Patent Literature 2, a magnet wire is first wound around a lower end of the terminal pin, wound upwardly to an upper end, and then wound downward to the lower end. This winding forms a double winding with a portion of the magnet wire from an upper end to a lower end of the winding being held from the outside.

As described above, the magnet wire is fixed to the terminal pin by winding the magnet wire around the terminal pin in double.

PATENT LITERATURE

Patent Literature 1: Japanese Unexamined Patent Application Publication No. 2011-129313
Patent Literature 2: Japanese Unexamined Patent Application Publication No. H09-215246

According to the aforementioned conventional winding methods for a coil at the start of winding, the coil is easily unwound if the terminal pin around which the magnet wire is wound at the start of winding is touched, for example, by a person in a manufacturing process. As a consequence, a portion wound around the stator core is also unwound, which causes the magnet wire to be in contact with the core, failing to ensure insulation between the magnet wire and the core. This is problematic in that electric motor stators with a stable quality cannot be achieved. Further, there is a problem in which the length of the magnet wire and the terminal pin needs to be increased, and winding is time intensive, since the above winding methods require an increased number of winding turns.

SUMMARY

The present invention has been made to solve the above problems, and has an object of providing a winding method for an electric motor stator that needs less winding time and is less easily unwound, an electric motor stator, and a fan electric motor.

According to one embodiment of the present invention, a winding method for an electric motor stator that includes: a stator core having a plurality of teeth; an insulator disposed on each of the plurality of teeth; a coil formed in a concentrated winding manner on each of the plurality of teeth having the insulator; a power supply terminal inserted into a connection side of the insulator terminal and supplying voltage to the coil, the power supply terminal including an insertion section inserted into the insulator and a bent back section bent by 180 degrees in a direction vertical to the insertion section; and a pin having an insulating property and juxtaposed to the power supply terminal on the connection side of the insulator, the winding method including: at a start of winding of the coil, a first step for forming a two-turn winding portion by winding a magnet wire upwardly around the pin for two turns; a second step, subsequent to the first step, for winding the magnet wire to cross the two-turn winding portion from an outside from an upper side to a lower side on a side surface of the pin opposite from the power supply terminal, winding the magnet wire below the two-turn winding portion to a side surface of the pin that faces the power supply terminal, winding the magnet wire to cross the two-turn winding portion from an outside from a lower side to an upper side on the side surface of the pin that faces the power supply terminal, and winding the magnet wire above the two-turn winding portion to the side surface of the pin opposite from the power supply terminal; and a third step, subsequent to the second step, for winding the magnet wire for a half turn on the upper side of the two-turn winding portion and then guiding the magnet wire to the power supply terminal to be hooked on the bent back section.

According to the winding method for an electric motor stator of one embodiment of the present invention, a winding time can be reduced since the magnet wire is wound around the pin with less winding turns than that of a conventional method. Further, the winding is less easily unwound since the two-turn winding portion that has been wound is held from the outside on both side surfaces by two cross sections that are subsequently wound.

DETAILED DESCRIPTION

With reference to the drawings, embodiments of the present invention will be described below. It should be noted that the present invention is not to be limited by those embodiments described below. Also, the dimensional relationship among components in the accompanying drawings may be different from the actual one.

Embodiment 1

Figure 1:
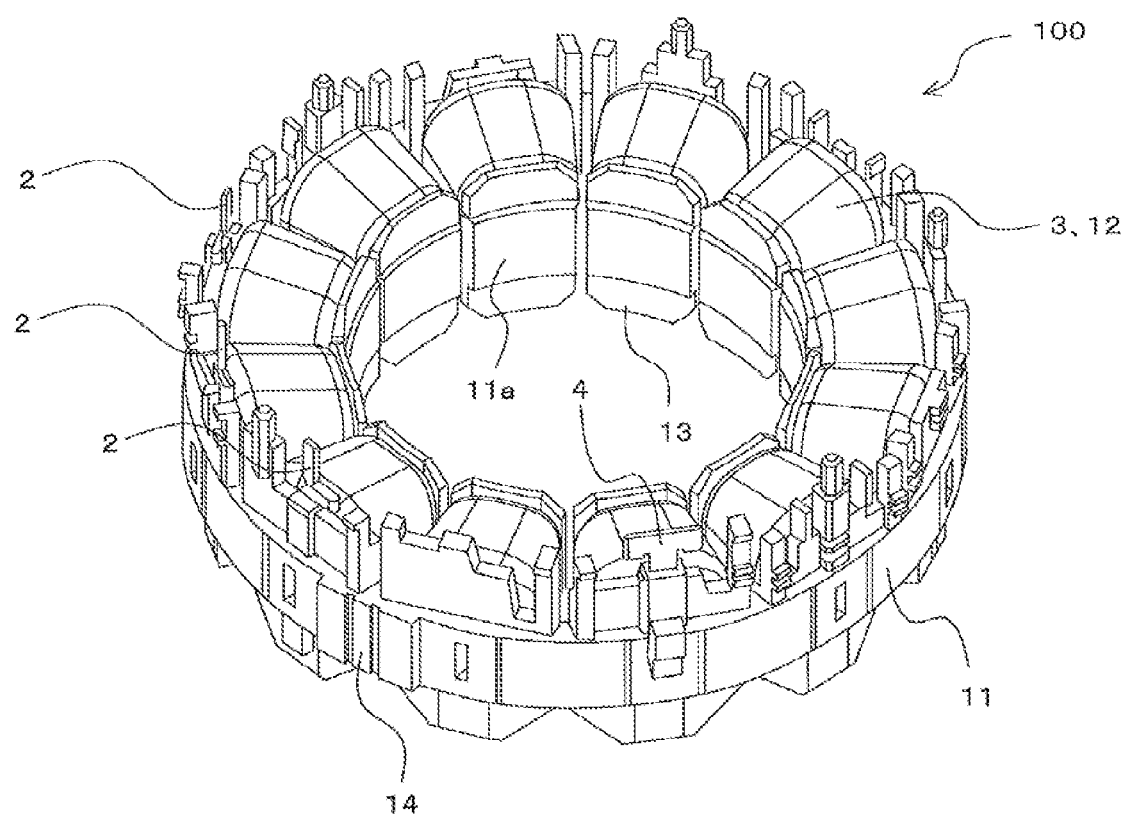
FIG. 1 is a perspective view for showing a configuration example of an electric motor stator according to Embodiment 1 of the present invention.
Figure 2:
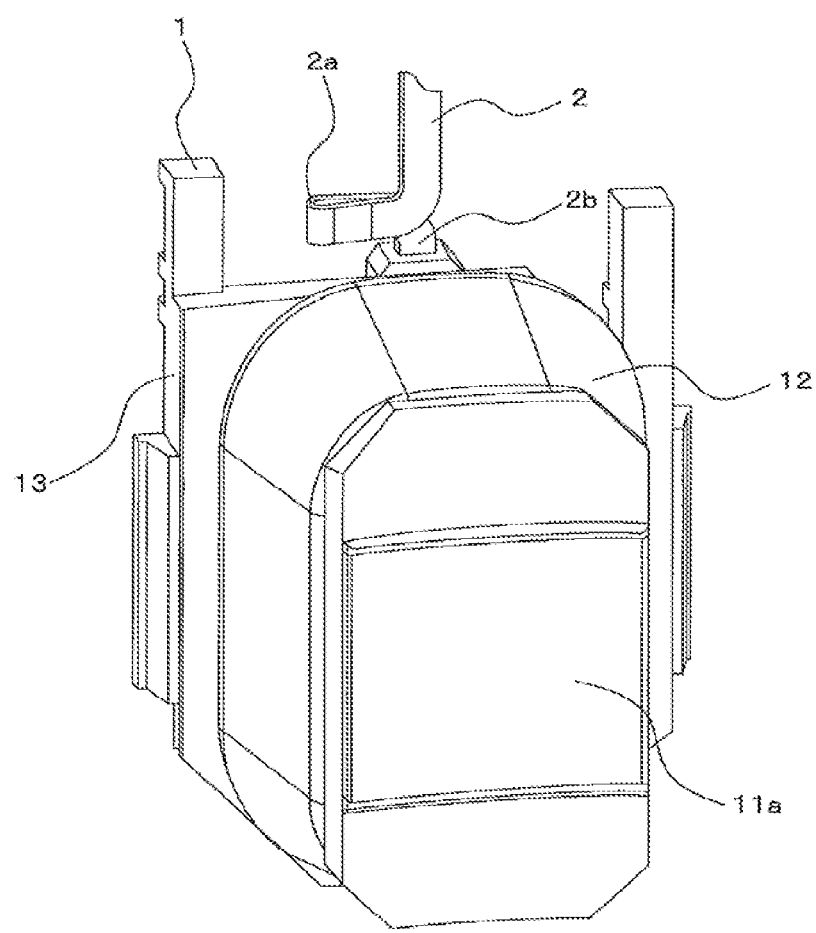
FIG. 2 is an enlarged perspective view of one of teeth shown in FIG. 1.

FIG. 1 is a perspective view for showing a configuration example of a stator 100 of an electric motor according to Embodiment 1 of the present invention, and FIG. 2 is an enlarged perspective view of one of teeth 11a shown in FIG. 1.

The stator 100 of the electric motor according to Embodiment 1 is, for example, combined with a rotor that uses a permanent magnet to constitute a brushless DC motor (synchronous electric motor). Further, the stator 100 includes three terminals to supply power (voltage) to coils 12. This stator 100 is used, for example, as a fan electric motor mounted on an air-conditioning apparatus having a heat pump.

As shown in FIG. 1, the stator 100 includes a stator core 11 having, for example, 12 teeth 11a that protrude toward an axial center, an insulator 13 disposed on each of the teeth 11a of the stator core 11, coils 12 of a three-phase Y-Y connection having a magnet wire 3 wound around each of the teeth 11a in a direct concentrated winding manner, and terminals inserted into four square holes formed on a connection side of the insulator 13, three of which are used to supply power to the coils 12 of the three-phase Y-Y connection and one of which is used as a neutral point. The Y-Y connection referred herein is made up of two Y connections connected in parallel. Further, the terminal used for supplying power to the coil 12 of the three-phase Y-Y connection is hereinafter referred to as a power supply terminal 2, and the terminal used as a neutral point is hereinafter referred to as a neutral point terminal 4.

At the start of winding, the coil 12 for each of the three-phase is connected to one of three power supply terminals 2 that are used for supplying power to the coil 12 of the three-phase Y-Y connection, and the coil 12 for each of the three-phase is connected to respective power supply terminals 2. Further, at the end of winding, the coil 12 for each of the three-phase is connected to the power supply terminal 2 that is used as a neutral point.

The stator core 11 is formed, for example, by punching an electromagnetic steel plate having a thickness of 0.1 to 0.7 mm into strip-shaped pieces, laminating them by a method such as clamping, welding, or adhesion, providing the three-phase Y-Y connection to the 12 teeth 11a formed by the lamination layer, and then bending the stator core 11 so that the teeth 11a are oriented to the axial center. That is, the stator 100 is formed by positive bending of the stator core 11 after winding, so that the teeth 11a face inward, and welding stator core overlapped sections 14 on both ends of the stator core 11 for secure connection.

The insulator 13 is provided for between the coil 12 and the stator core 11. The insulator 13, which is made of, for example, a thermoplastic resin such as PBT (polybutylene terephthalate), is provided for each of the teeth 11a and integrally formed with the stator core 11. Alternatively, after forming the insulator 13, it may be assembled to each of the teeth 11a. In that case, the insulator 13 is divided into the connection side and the non-connection side, each of which is inserted from the respective ends of each of the teeth 11a in the axial direction to form the insulator 13.

Further, a bundling pin 1 is provided to protrude toward the connection side from an outer wall of the insulator 13 into which the power supply terminal 2 is inserted so that the magnet wire 3 is wound around the bundling pin 1 at the start of winding. This bundling pin 1 is electrically insulative, and, for example, formed by molding a resin into a square pillar shape. The bundling pin 1 is juxtaposed to the power supply terminal 2.

The bundling pin 1 corresponds to a "pin" of the present invention.

The power supply terminal 2 is formed by bending a flat wire. The flat wire is made of a copper material and is plated by, for example, hot dip tin-copper alloy plating. The flat wire has, for example, a thickness of 0.5 mm and a width of 1.0 mm. The power supply terminal 2 is formed by bending the flat wire by 90 degrees to an insertion section 2b that is inserted into a square hole (not shown) on an outer wall of the insulator 13 and then bending back by 180 degrees at a predetermined position to form a bent back section 2a. Then, the power supply terminal 2 is bent by 90 degrees in a direction opposite to the insertion section 2b inserted into the insulator 13. It should be noted that the above bending angles of the flat wire may not be exactly 90 degrees and 180 degrees, and may be, for example, 89 degrees and 179 degrees.

Figure 3A:
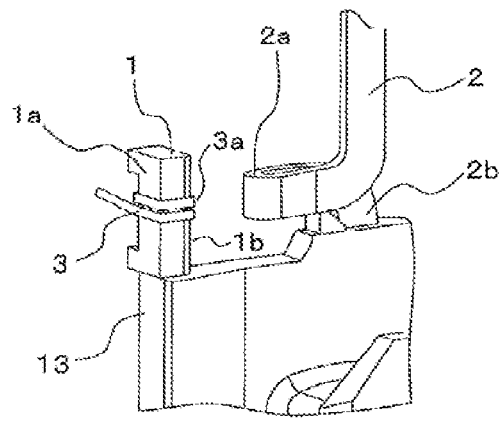
FIG. 3A is a diagram for showing a first step of a winding method for the electric motor stator according to Embodiment 1 of the present invention.
Figure 3B:
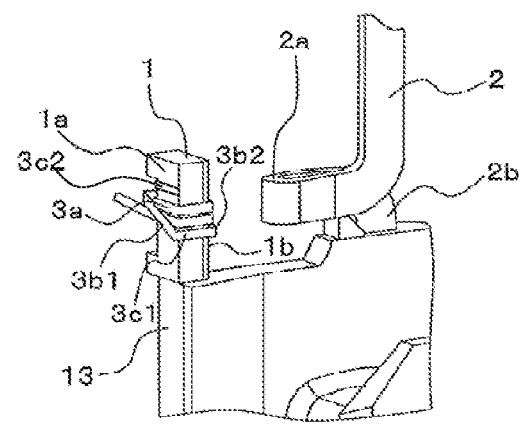
FIG. 3B is a diagram for showing a second step of the winding method for the electric motor stator according to Embodiment 1 of the present invention.

FIG. 3A is a diagram for showing a first step of a winding method of the stator 100 of the electric motor according to Embodiment 1 of the present invention. FIG. 3B is a diagram for showing a second step of the winding method of the stator 100 of the electric motor according to Embodiment 1 of the present invention, and FIG. 3C is a diagram for showing a third step of the winding method of the stator 100 of the electric motor according to Embodiment 1 of the present invention.

Figure 3C:
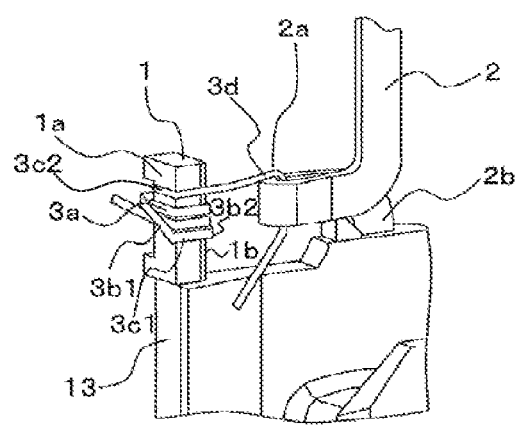
FIG. 3C is a diagram for showing a third step of the winding method for the electric motor stator according to Embodiment 1 of the present invention.

With reference to FIGS. 3A to 3C, of the winding method of the stator 100 of the electric motor according to Embodiment 1, a winding method for the coil 12 at the start of winding will be described below.

The winding method according to Embodiment 1 includes a first step, a second step, and a third step.

First, in the first step shown in FIG. 3A, one end of the magnet wire 3 is held, for example, by a chuck (not shown) and the other end is held by a nozzle (not shown). The nozzle turns upwardly around the center portion of the bundling pin 1 for two times to form a two-turn winding portion 3a.

Then, in the second step shown in FIG. 3B, the magnet wire 3 is wound to cross the two-turn winding portion 3a from the outside from the upper side to the lower side on a side surface (hereinafter, referred to as a first side surface 1a) of the bundling pin 1 opposite from the power supply terminal 2 to form a first cross section 3b1, and is then wound below the two-turn winding portion 3a to a side surface (hereinafter, referred to as a second side surface 1b) of the bundling pin 1 that faces the power supply terminal 2 to form a lower winding section 3c1. Then, the magnet wire 3 is wound to cross the two-turn winding portion 3a from the outside from the lower side to the upper side on the second side surface 1b of the bundling pin 1 to form a second cross section 3b2, and is then wound above the two-turn winding portion 3a to the first side surface 1a of the bundling pin 1 to form an upper winding section 3c2. Thus, the magnet wire 3 is wound for one turn so that a cross section 3b (which is a comprehensive term for the first cross section 3b1 and the second cross section 3b2) is formed on each of both side surfaces of the bundling pin 1.

Then, in the third step shown in FIG. 3C, the magnet wire 3 is wound for a half turn above the two-turn winding portion 3a, and is then led to the power supply terminal 2 to be hooked on the bent back section 2a to form a hooked portion 3d.

As described above, according to the winding method for the coil 12 at the start of winding of Embodiment 1, the number of turns of the magnet wire 3 wound around the bundling pin 1 and a winding time are reduced compared with conventional arts. Further, the two-turn winding portion 3a that has been first wound is held from the outside on both side surfaces by the cross section 3b that are subsequently wound. Accordingly, the two-turn winding portion 3a is restrained by the cross section 3b so that the magnet wire 3 is less easily unwound from the bundling pin 1 even if the two-turn winding portion 3a is pulled.

Furthermore, the magnet wire 3 is wound below the two-turn winding portion 3a to the second side surface 1b of the bundling pin 1 to form the lower winding section 3c1, and is then wound on the second side surface 1b of the bundling pin 1 from the lower side to the upper side to form the second cross section 3b2, and is then wound above the two-turn winding portion 3a to the first side surface 1a of the bundling pin 1 to form the upper winding section 3c2. Accordingly, when the second cross section 3b2 is formed on the second side surface 1b of the bundling pin 1 from the lower side to the upper side, the two-turn winding portion 3a that has been wound serves as a wall that prevents the lower winding section 3c1 wound below the two-turn winding portion 3a from being lifted upwardly.

As a result, the lower winding section 3c1 wound below the two-turn winding portion 3a is stable in position, thereby ensuring a stable state of the cross section 3b.

As described above, of the winding method of the stator 100 of the electric motor according to Embodiment 1, according to the winding method for the coil 12 at the start of winding, a winding time can be reduced since the magnet wire 3 is wound around the bundling pin 1 with less winding turns compared with conventional arts. Further, the winding is less easily unwound since the two-turn winding portion 3a that has been wound is held from the outside on both side surfaces of the bundling pin 1 by two cross sections 3b that are subsequently wound. Moreover, the two-turn winding portion 3a that has been wound serves as a wall that prevents the lower winding section 3c1 wound below the two-turn winding portion 3a from being lifted upwardly, thereby ensuring a stable state of the cross section 3b.

Embodiment 2

Embodiment 2 of the present invention will be described below. Any description duplicating with that in Embodiment 1 will be (partly) omitted, and any part identical or equivalent to that in Embodiment 1 will be denoted by the same reference numeral.

Figure 4:
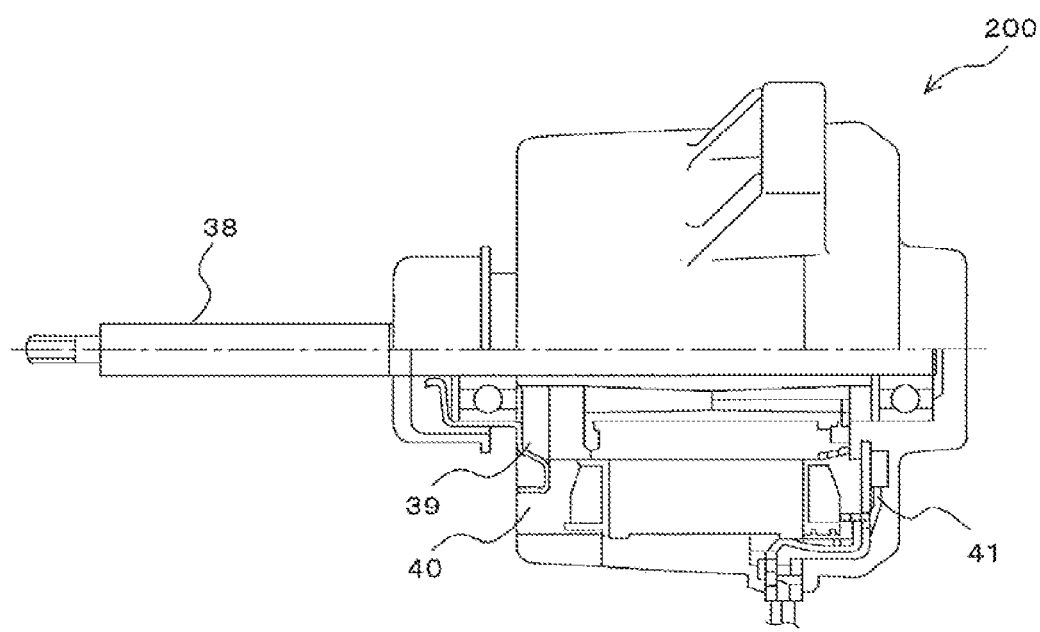
FIG. 4 is an explanatory view for showing a fan electric motor according to Embodiment 2 of the present invention.

FIG. 4 is an explanatory view for showing a fan electric motor 200 according to Embodiment 2 of the present invention.

With reference to FIG. 4, the fan electric motor 200 according to Embodiment 2 will be described below.

The fan electric motor 200 according to Embodiment 2 includes the stator 100 according to Embodiment 1.

As shown in FIG. 4, the fan electric motor 200 includes a rotor 38, a bracket 39, a molded stator 40 formed by mold-forming the stator 100, and a connection component 41 (substrate). In manufacturing of the fan electric motor 200, the stator 100 and the connection component 41 connected to the outside are assembled, mechanically and electrically joined together, and then molded, and after that, components such as the rotor 38 and the bracket 39 are assembled thereto. Accordingly, the fan electric motor 200, which includes the stator 100 according to Embodiment 1, has high quality.

The invention claimed is:

1. A method for starting the winding of an electric motor stator that includes:
   a stator core having a plurality of teeth;
   an insulator disposed on each of the plurality of teeth;
   a coil formed in a concentrated winding manner on each of the plurality of teeth having the insulator;
   a power supply terminal inserted into a connection side of the insulator and supplying voltage to the coil, wherein the power supply terminal includes an insertion section, which is inserted into the insulator, and a bent back section, which is bent by 90 degrees with respect to the insertion section and then bent back by 180 degrees in a direction toward the insertion section; and
   a pin having an insulating property and two side surfaces, wherein a first one of the side surfaces is opposite from the power supply terminal and a second one of the side surfaces faces the power supply terminal, wherein the pin is juxtaposed to the power supply terminal on the connection side of the insulator, said method comprising:
   at a start of winding of the coil, a first step for forming a two-turn winding portion by winding a magnet wire around the pin for two turns in a direction toward a distal end of the pin;
   a second step, subsequent to the first step, for winding the magnet wire to cross the two-turn winding portion from an outside on both of the first and second side surfaces of the pin; and
   a third step, subsequent to the second step, for guiding the magnet wire to be hooked on the bent back section.

2. An electric motor stator comprising:
   a stator core having a plurality of teeth;
   an insulator disposed on each of the plurality of teeth;
   a coil formed in a concentrated winding manner on each of the plurality of teeth having the insulator;
   a power supply terminal inserted into a connection side of the insulator and supplying voltage to the coil, wherein the power supply terminal includes an insertion section, which is inserted into the insulator, and a bent back section, which is bent by 90 degrees with respect to the insertion section and then bent back by 180 degrees in a direction toward the insertion section;
   a pin having an insulating property and two side surfaces, wherein a first one of the side surfaces is opposite from the power supply terminal and a second one of the side surfaces faces the power supply terminal, wherein the pin is juxtaposed to the power supply terminal on the connection side of the insulator;
   a two-turn winding portion, which is wound around the pin for two turns in a direction toward a distal end of the pin;
   cross sections in which the magnet wire extending from an end portion of the winding portion is wound from an outside around both side surfaces of the pin and crossed with the two-turn winding portion on both first and second side surfaces; and
   a hooked portion in which the magnet wire extends from an end portion of one of the cross sections and is hooked on the bent back section.

3. A fan electric motor comprising the electric motor stator of claim 2.

* * * * *